UNITED STATES PATENT OFFICE.

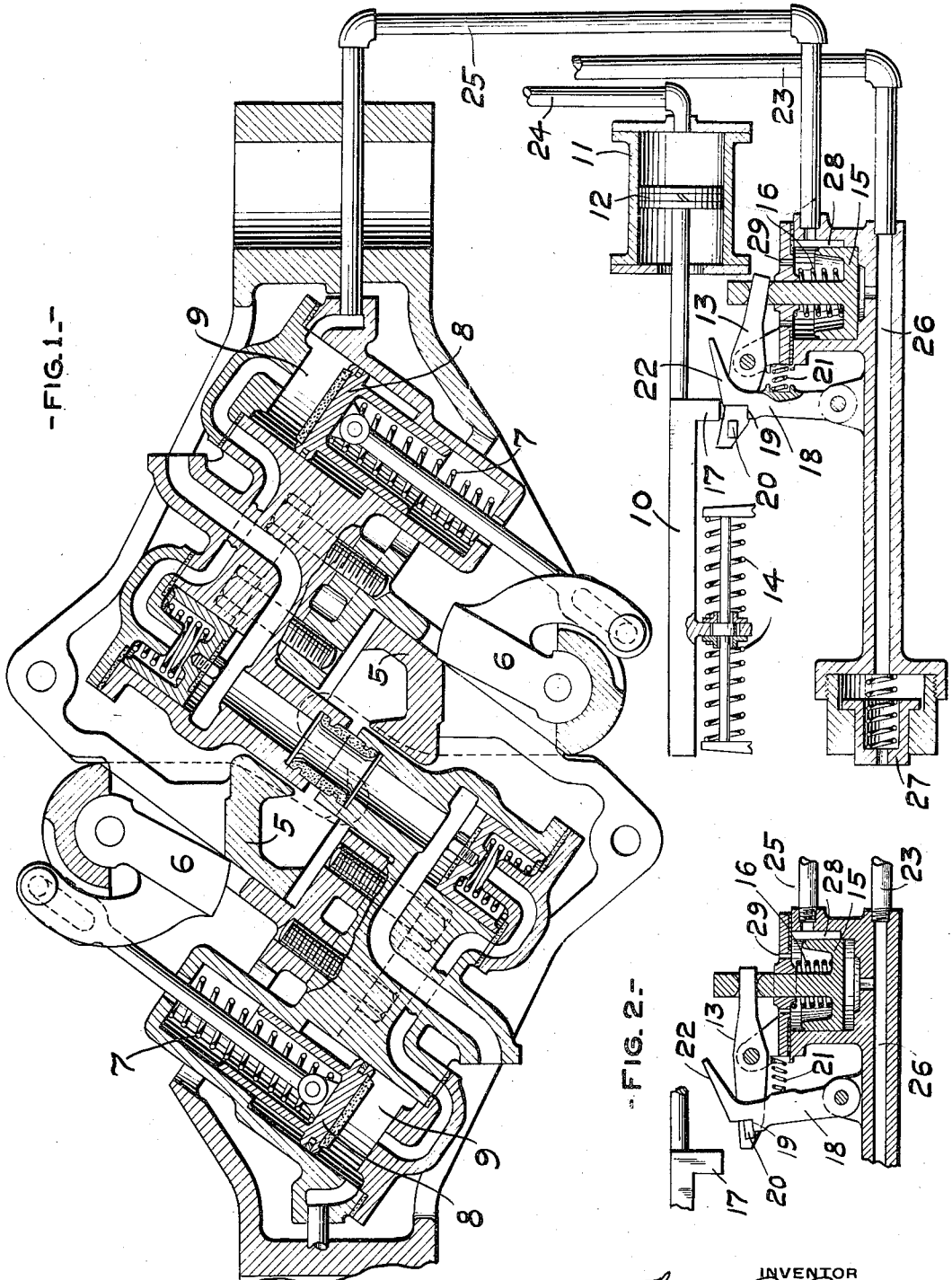

THOMAS R. BROWN, OF SPARKILL, NEW YORK, ASSIGNOR TO THE WESTINGHOUSE AIR BRAKE COMPANY, OF WILMERDING, PENNSYLVANIA, A CORPORATION OF PENNSYLVANIA.

CAR AND ELECTRIC-TRAIN-LINE COUPLING.

1,290,708.      Specification of Letters Patent.      Patented Jan. 7, 1919.

Application filed May 17, 1917. Serial No. 169,236.

*To all whom it may concern:*

Be it known that I, THOMAS R. BROWN, a citizen of the United States, residing at Sparkill, in the county of Rockland and State of New York, have invented a certain new and useful Improvement in Car and Electric-Train-Line Couplings, of which improvement the following is a specification.

This invention relates to appliances for coupling cars and for connecting the electric train line circuits between the cars or other vehicles of the train.

In my prior Patent No. 1,194,353, of August 15, 1916, there is shown a car coupler of the rigid lock type having a fluid pressure actuated piston for releasing the lock, and an electric portion having a plurality of contact terminals connected to the respective car line circuits; a movable slide having corresponding contacts, with a piston for projecting the slide into a counterpart coupler; a locking device for the slide; and a fluid pressure actuated piston for releasing the slide, whereby the same may be returned from the projected position to the normal retracted position by means of springs. There is also a valve means governed by the return movement of the slide for controlling the supply of fluid to the unlocking piston of the coupler.

My present invention has for its object to provide an improved interlocking mechanism for the contact slide and for controlling the supply of fluid to the piston for releasing the coupler lock.

In the accompanying drawing: Figure 1 is a diagrammatic sectional view showing two counterpart couplers about to be coupled together, and the contact slide and improved interlocking mechanism of one coupler; and Fig. 2, a detail view showing the interlocking mechanism in position for releasing the slide.

According to this construction, my improvement is illustrated in connection with a car coupler of the rigid lock type having a projecting hook-shaped portion 5, having vertical plane surfaces adapted to engage the corresponding surfaces of the counterpart coupler with a lateral inclined movement when the couplers are brought together, and a pivoted locking lever, 6, adapted to be clamped against the counterpart coupler head for locking the same together, a spring, 7, for forcing said lever into locking position, and a piston, 8, operating in cylinder, 9, for releasing said locking lever.

The electric portion may be attached to the coupler head in any suitable or preferred manner, and includes the contact carrier or slide, 10, adapted to be held in its normal retracted position by means of the centering springs, 14, but having a cylinder, 11, and piston, 12, for projecting the contact slide outward and into the counterpart coupler of the adjoining car for establishing electrical connection between the corresponding car line circuits as fully set forth in my prior patent above referred to.

The contact slide is held in its outer or projected position by means of the pivoted locking lever, 13, actuated by the piston, 15, and spring, 16, and adapted to engage a projection or lug, 17, on the slide. The spring, 16, normally holds the piston, 15, at the bottom of its chamber, and the lever, 13, in position to be engaged at its outer end by the projection, 17, of the slide, 10, when the same is projected to its outer position by admitting fluid through pipe, 24, to cylinder, 11, and piston, 12.

When fluid under pressure is admitted by pipe, 23, to the bottom of the chamber of piston, 15, the locking lever, 13, is turned to release the slide, 10, and to this extent the construction is similar to that shown in my prior patent before referred to, but according to my present improvement, means are employed for limiting the movement of the piston, 15, and thereby preventing the flow of compressed air to the unlocking piston of the coupler until the slide has returned to its normal position. For this purpose, I have shown a pivoted arm, 18, having a notch, 19, serving as a stop for a projection, 20, on the lever, 13, and thereby limit the upward movement of the piston, 15, to a point at which the port, 28, is not opened. A spring, 21, bears upon the pivoted arm, 18, which also has a projection, 22, adapted to be engaged by the projection, 17, of the slide for swinging the arm back against the spring, 21, to clear the pin, 20, from the notch, 19, when the slide returns to its normal position.

When the counterpart couplers have been coupled together, and one of the contact slides projected by the admission of air to cylinder, 11, and piston, 12, the locking lever, 13, is actuated by spring, 16, to engage behind the projection, 17, of the slide and hold the same in its projected position. When it is desired to uncouple and separate the cars, air is admitted by pipe, 23, to the chamber of piston, 15, which communicates by passage, 26, and hollow tappet, 27, with the corresponding chamber on the other coupler, whereby both of said pistons will be subjected to the air pressure. On the coupler in which the slide has been projected, the piston, 15, will be forced up against the spring, 16, and turn the lever, 13, until the projecting pin, 20, strikes the stop, 19, of the arm, 18, as indicated in Fig. 2. This movement is sufficient to release the projection, 17, of the slide, 10, but not great enough to open the port, 28, communicating with pipe, 25, and the unlocking cylinder, 9, of the coupler. The spring, 14, will then operate to return the slide to its normal retracted position, during which movement the slide engages the part, 22, of the arm, 18, and swings the same against the spring, 21, sufficiently for the pin, 20, to clear the notch, whereupon the air pressure acting on piston, 15, immediately forces the piston to its extreme upper position in which the port, 28, is opened and the air flows through pipe, 25, to the cylinder, 9, where it acts upon the unlocking piston, 8, to release the coupler lock, 6.

In the other coupler, the piston, 15, is not restrained in its movement so that the port, 28, is promptly opened when the compressed air is first applied, and consequently the coupler lock of the coupler head in which the slide is not projected, will be immediately released. Inasmuch, however, as both coupler locks must be released before the couplers can be separated, the uncoupling action is not complete until the slide has been returned to its normal retracted position, and the coupler lock withdrawn, as above described. This is an important feature of safety and insures the withdrawal of the slide before the couplers are released and pulled apart.

The unlocking piston, 8, of the coupler can not be prematurely operated by any air pressure caused by leakage around the piston, 15, before the port, 28, is opened, since the ports, 29, provide for the escape of the air which may leak by the piston at this time. The leakage ports, 29, are closed, however, when the piston, 15, makes its full traverse and seats against its gasket.

It will now be seen that the piston, 15, has a preliminary movement for releasing the lock of the contact carrier, and a further movement for controlling a supply of fluid to release the coupler lock, the preliminary movement being limited by a stop which is adapted to be shifted to its set position by the outward movement of the contact carrier or slide, and to be released by the return movement of the contact carrier to its normal retracted position.

Having now described my invention, what I claim as new and desire to secure by Letters Patent is:

1. In a combined car and electric coupler, the combination with a movable coupler lock, and a fluid pressure device for releasing the same, of a movable electric contact carrier adapted to be projected into the opposite coupler, a lock for holding said carrier in its projected position, a piston for releasing the carrier lock and for controlling a supply of fluid to release the coupler lock, and means governed by the movement of the contact carrier for controlling the movement of said piston.

2. In a combined car and electric coupler, the combination with a movable coupler lock, and a fluid pressure device for releasing the same, of a movable electric contact carrier adapted to be projected into the opposite coupler, a lock for holding said carrier in its projected position, a piston having a preliminary movement for releasing the carrier lock and a further movement for opening a supply of fluid to release the coupler lock, a stop for limiting the preliminary movement of the piston, and means operated by the return movement of the contact carrier for releasing the stop.

3. In a combined car and electric coupler, the combination with a movable coupler lock, and a fluid pressure device for releasing the same, of a movable electric contact carrier adapted to be projected into the opposite coupler, a lock for holding said carrier in its projected position, a piston having a preliminary movement for releasing the carrier lock and a further movement for opening a supply of fluid to release the coupler lock, and means for temporarily limiting the preliminary movement of said piston.

4. In a combined car and electric coupler, the combination with a movable coupler lock, and a fluid pressure device for releasing the same, of a movable electric contact carrier adapted to be projected into the opposite coupler, a lock for holding said carrier in its projected position, a piston having a preliminary movement for releasing the carrier lock and a further movement for opening a supply of fluid to release the coupler lock, and a movable stop controlled by the movement of the contact carrier for limiting the preliminary movement of said piston.

5. In a combined car and electric coupler, the combination with a movable coupler lock, and a fluid pressure device for releasing the same, of a movable electric contact carrier adapted to be projected into the opposite coupler, a lock for holding said carrier in its projected position, a piston having a preliminary movement for releasing the carrier lock and a further movement for opening a supply of fluid to release the coupler lock, a movable stop for limiting the preliminary movement of the piston, and means controlled by the outward movement of the contact carrier for setting the stop and by the return movement for releasing the stop.

6. In a combined car and electric coupler, the combination with a movable coupler lock, and a fluid pressure device for releasing the same, of an electric contact carrier adapted to be projected into the opposite coupler, a pivoted locking lever for holding said carrier in its projected position, a piston connected to said locking lever and having a preliminary movement for releasing same and a further movement for opening a supply of fluid to release the coupler lock, a stop adapted to engage said locking lever in one position, and means operated by the movement of the contact carrier for shifting said stop.

In testimony whereof I have hereunto set my hand.

THOMAS R. BROWN.